United States Patent Office 3,229,834
Patented Jan. 18, 1966

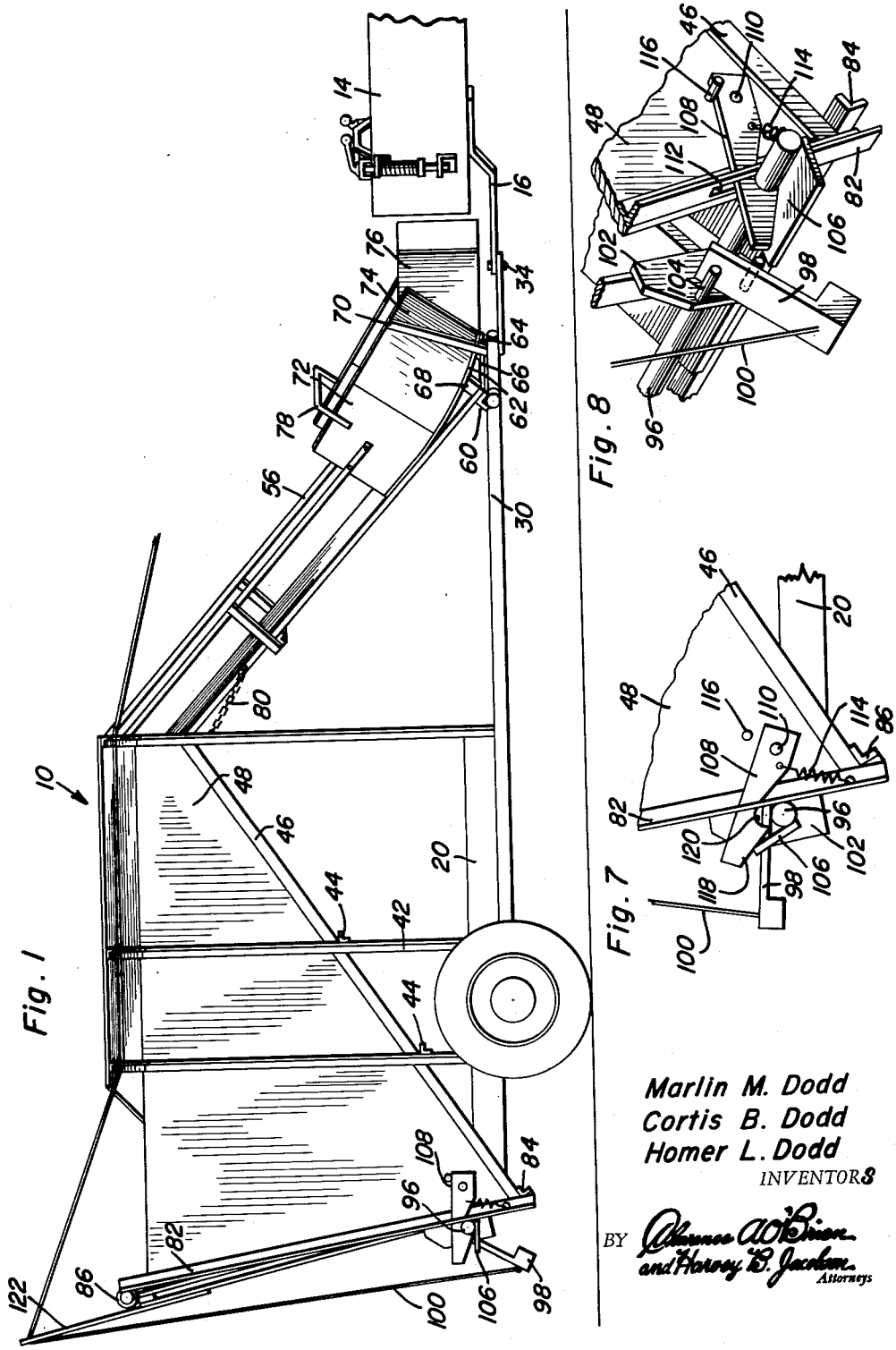

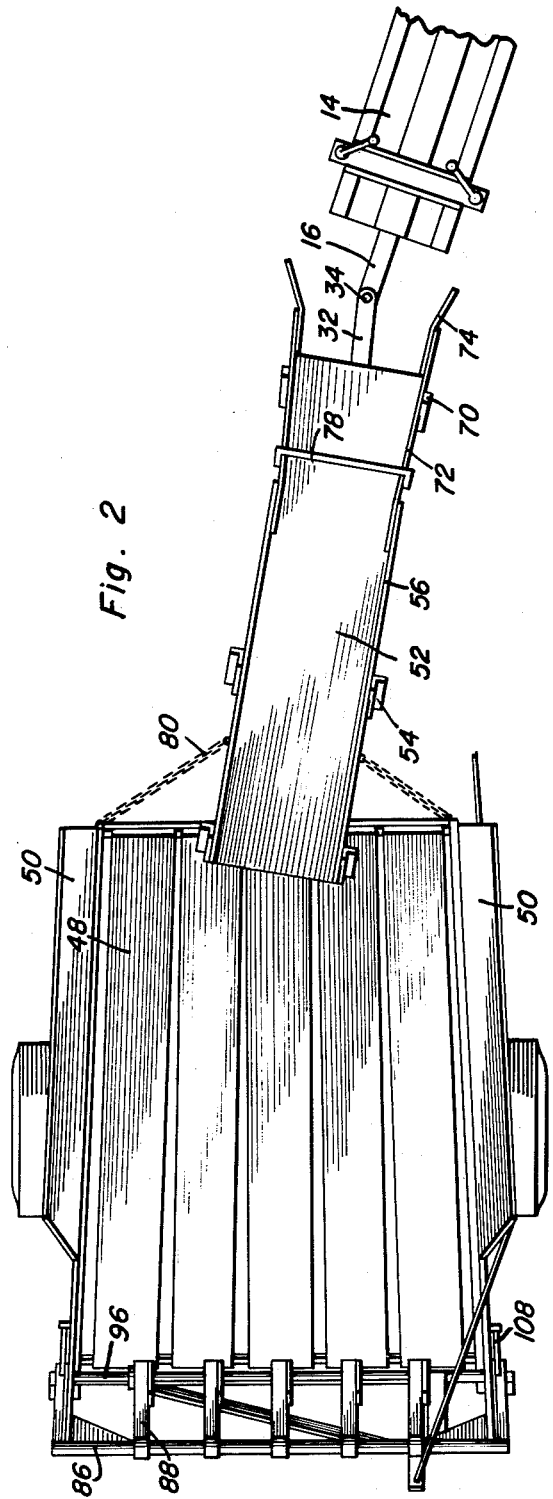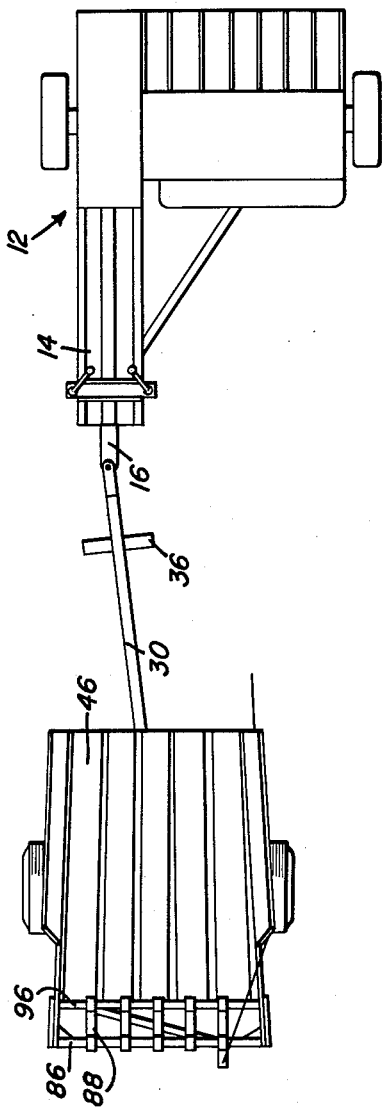
Marlin M. Dodd
Cortis B. Dodd
Homer L. Dodd
INVENTORS

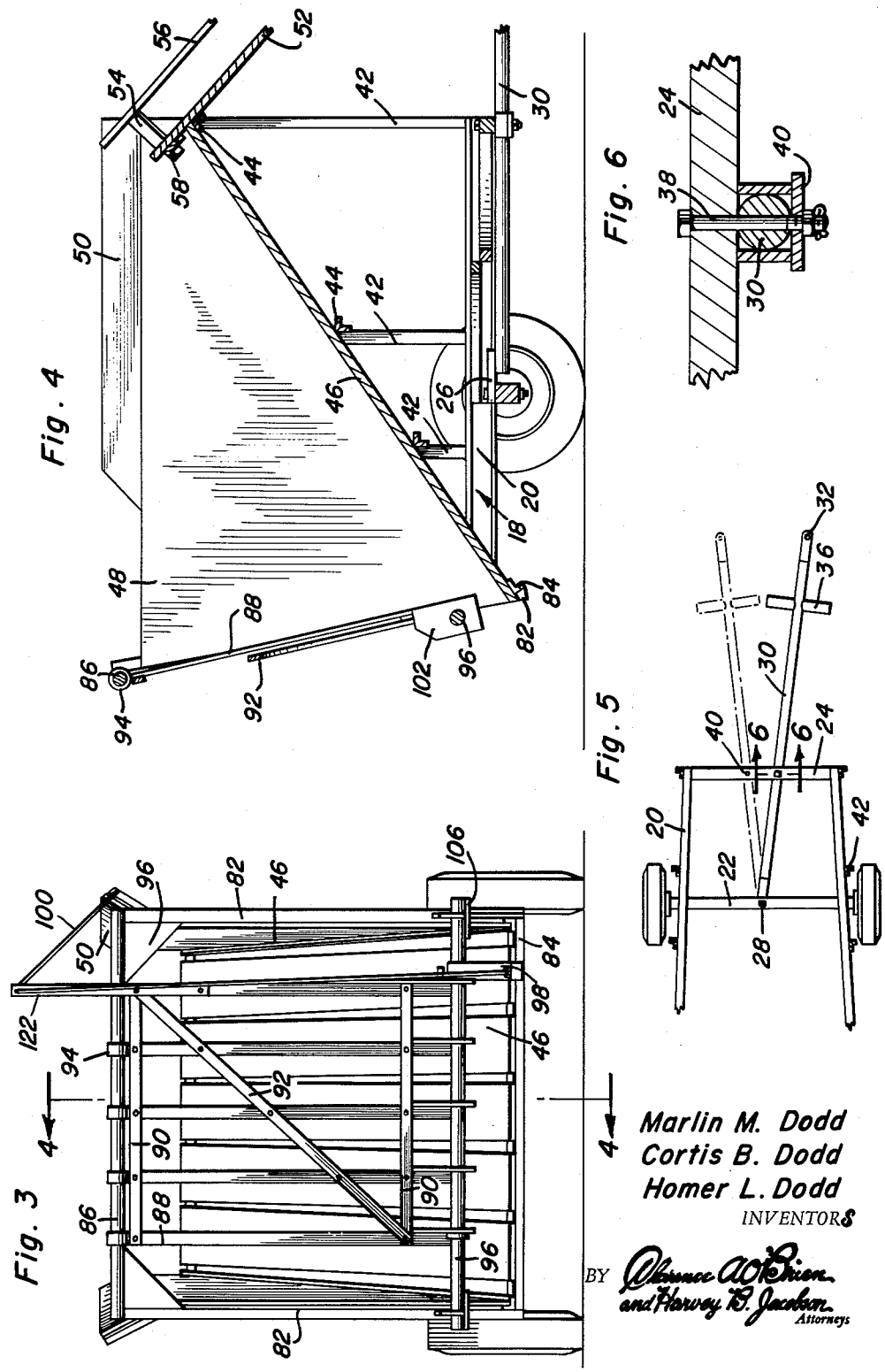

3,229,834
HAY BALE CARRIER
Marlin M. Dodd, Arcola, and Cortis B. Dodd and Homer L. Dodd, Lockwood, Mo.
Filed Aug. 18, 1964, Ser. No. 390,352
6 Claims. (Cl. 214—85)

The present invention relates to a hay bale carrier generally in the form of a trailer adapted for attachment to a hay baler of the mobile type for receiving the bales of hay therefrom and transporting them until the carrier has received a number of bales that will substantially fill it thus enabling the bales to be collected into groups.

In present day practice, hay is harvested by using machines that either enable the hay to be cut and baled at the same time or cut and subsequently collected by a pick-up baler. In any event, the bales formed by the mobile baling apparatus are discharged onto the field as they are formed thus scattering the bales substantially throughout the surface of the field thereby requiring the expenditure of considerable labor in collecting the bales and hauling them into a storage area. Accordingly, it is an object of the present invention to provide a bale carrier adapted to be attached to a hay baler for receiving the bales therefrom and for discharging the bales in piles or groups so that the bales may be subsequently more easily collected and hauled to a storage area.

A further object of the present invention is to provide a hay bale carrier adapted to be connected to a hay baler in trailing relation thereto and including an upwardly inclined ramp which employs the force of discharge of the hay bales from the hay baler in order to convey the hay bales up the ramp.

Still another feature of the present invention is to provide a hay bale carrier in accordance with the preceding objects in which the trailer structure is substantially V-shaped or provided with an inclined bottom structure together with a releasable gate at the lower rear end thereof which is controllable from an operator's platform on the hay baler or the like which enables the hay bales to be dumped from the carrier whenever desired thus enabling the point of discharge of the hay bales to be controlled.

Yet another important object of the present invention is to provide a hay bale carrier which is simple in construction, easy to use, adapted for connection with a conventional hay baler, relatively inexpensive to manufacture and easy to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the hay bale carrier of the present invention illustrating its association with a hay baler;

FIGURE 2 is a top plan view of the assembly of FIGURE 1 illustrating the orientation of components thereof;

FIGURE 3 is a rear elevational view of the hay bale carrier;

FIGURE 4 is a longitudinal, section view taken substantially upon a plane passing along section line 4—4 of FIGURE 3 illustrating the specific construction of the hay bale carrier;

FIGURE 5 is a plan view of the hay bale carrier illustrating the construction of the drawbar associated therewith;

FIGURE 6 is a detailed sectional view taken substantially upon a plane passing along section line 6—6 of FIGURE 5 illustrating the latch structure for the drawbar;

FIGURE 7 is a detailed elevational view illustrating the latch mechanism for the tailgate of the carrier illustrating it in released position;

FIGURE 8 is a perspective view of the latch mechanism; and

FIGURE 9 is a plan view similar to FIGURE 2 but illustrating the carrier in trailing relation to the hay baler.

Referring now specifically to the drawings, the hay bale carrier 10 is illustrated as being attached to a conventional hay baler 12 of the type which is either tractor drawn or self-propelled and includes the usual discharge chute or chamber 14. Attached to the underside of the discharge chamber or chute 14 is a drawbar 16 having a downwardly offset rear end portion projecting longitudinally rearwardly from the baler.

They hay bale carrier 10 includes a frame 18 including a pair of longitudinal rails 20 which are interconnected by a transverse axle 22 generally at the center thereof and a forward transverse member 24. Attached to the center of the axle 22 is a forwardly extending bracket 26 having pivotal connection to the axle by virtue of a pivot bolt or pin 28. The bracket 26 is rigidly affixed to the top surface of an elongated pipe or structural member 30 forming a tongue having a head structure 32 on the forward end thereof for detachable connection with the drawbar 16 as by use of a pivot bolt or pin 34. The head structure 32 is in the form of a bracket welded or otherwise secured to the underside of the pipe 30 and adjacent the forward end of the pipe 30, there is provided a transversely extending tubular member 36. The front transverse member 24 is provided with a bolt 38 received in one of a pair of apertures 40 for securing the tongue 30 in a selected angular position. The bolt 30 has a generally U-shaped member 41 thereon for bridging and receiving the pipe or rod which forms the tongue 30 so that the bolt 38 may be removed and the tongue 30 swung to an angular position. As illustrated in FIGURE 9, the tongue 30 may be orientated in a position so that the hay bale carrier 10 will track behind the hay baler 12. In the other position of the tongue, the position illustrated in full line in FIGURE 5, the hay bale carrier will track directly behind the discharge chamber or compartment of the hay baler with the bolt 34 enabling relative pivotal movement therebetween.

Attached to and extending upwardly from the frame 18 is a plurality of vertical supporting brackets 42 which are of different lengths and which are interconnected at their upper ends by transverse angle iron members 44 which engage and support an inclined bottom wall 46 for a compartment or body receiving the hay bales. The bottom 46 is provided with upstanding side walls 48 which are generally triangular in configuration so that the top edges thereof are generally horizontal. The bottom 46 may be a solid bottom or in the form of a slatted bottom and the side walls 48 may be solid members or slatted members in which the side walls converge slightly forwardly. At the upper forward end of each side wall 48, there is provided an upstanding and slightly outwardly inclined wall portion 50 for guiding material between the side walls 48.

Engaged over the upper edge of the bottom 46 is an elongated flat chute 52 having a smooth surface on the upper surface thereof together with upstanding supports 54 supporting guide rods 56 for guiding a bale of hay up the chute 36. Depending lugs 58 are provided on the bottom surface of the bottom member 32 to engage and position the chute 52 in relation to the bottom 46 so that it will be retained in registry therewith even though the hay bale carrier may pivot in relation to the hay baler. The forward end of the chute 52 is provided with a transverse angle iron member 60 which rests on and engages the tongue 30 and in particular the inverted angle iron member 60 engages the transverse member 36 for positioning and retaining the chute in place. The bottom of the chute 52 curves gently as at 62 and is connected with an angle iron member 64 that is rigidly secured in place by braces 66 that extend forwardly from upstanding supports 68 carried by the angle iron member 60. Upstanding angle iron members 70 are secured to the braces 66 and the member 64 and are connected to and support side guide members 72 having their rear ends attached to the guide rails 56 and having their forward ends outwardly flared as at 74 for guiding hay bales 76 from the compression chamber 14 of the hay baler onto the chute 52. An inverted U-shaped member 76 extends transversely between the side guides 72 for retaining the side guides in parallel relation. Flexible chains 80 are provided between the chute 52 and the upstanding support members 42 at the forward ends of the frame for serving to retain the chute 52 in position. Also, the upstanding members 42 extend upwardly along the side walls 48 to support the outwardly flared top portions 50 as illustrated in FIGURE 1.

The side walls 48 have a reinforcing angle iron 82 attached to the rear edges thereof which have an angle iron 84 extending across the bottom edge thereof underneath the bottom 46 with these elements being rigidly connected by welding or the like. Interconnecting the upper ends of the angle iron members 82 is a solid or tubular rod 86 forming a hinge support for a rear closure member in the form of a tailgate constituted by a plurality of straps or slats 88 that are secured together in parallel relation by transverse straps 90 and a diagonal strap or bar 92. The upper ends of the straps 88 have loops or rings 94 formed thereon or connected thereto for hinging engagement with the transverse rod or tube 86 thus forming a hinge axis for the tailgate. Triangular gussets 96 are provided between the angle iron members 82 and the transverse member 86 to not only reinforce the rear frame structure of the carrier but also to orientate the tailgate generally centralized in the rear of the carrier.

The bottom of the parallel straps or bars 88 are interconnected by a transverse bar or rod 96 which projects beyond the angle iron members 82 as illustrated in FIGURE 8. The transverse lower rod 96 is pivotally attached to the lower ends of the straps or bars 88 and adjacent one end of the rod 96, there is provided a laterally extending arm 98 having a flexible cord or rope 100 attached thereto adjacent the other end so that upon swinging movement of the arm 98, the tubular member or rod 96 will be rotated about its longitudinal axis. A supporting plate 102 is attached to one of the bars or straps 88 and the plate 102 has a pair of projecting pins 104 thereon which limit the upper and lower extremities of the movement of the arm 98 thereby assuring that the rope 100 will only swing the arm 98 through a predetermined angular position. Attached to each outer end portion of the transverse rod 96 is a tangentially extending plate 106 which is welded thereto or otherwise permanently secured thereto for a purpose described hereinafter.

Adjacent the lower end of each side angle iron 82, there is provided a latch member 108 pivotally supported on the side wall 48 by a pivot pin 110 and having an end portion extending through a slot 112 in the outwardly extending angle of the angle iron member 82. A coil spring 114 interconnects the latch 108 and the lower end portion of the angle iron member 82 thus biasing the latch member 108 downwardly within the limits defined by the slot 112. A projecting pin 116 is provided on the side wall 48 above the latch 108 and forwardly of the pivot pin 110 to limit the downward swinging movement of the rear end of the latch 108.

The rear or free end of the latch 108 is provided with an inclined surface 118 which inclines downwardly to a notch 120 conforming generally with a portion of the surface of the transverse rod or tube 96 and extending around substantially one-half of or slightly more than one-half of the circumference of the rod or tube 96 for locking the rod or tube 96 in place against the angle iron member 82.

The latch 108 will normally retain the tailgate in closed position but when the rope 100 is pulled, the arm 98 will swing upwardly thus swinging the transverse rod 96 about its longitudinal axis. This movement will cause the plate 106 to swing in an arcuate path to engage it with the inclined surface 118 thus lifting the latch 108 away from its latching position thereby releasing the lower end of the tailgate so that hay bales within the carrier and resting on the inclined bottom 46 will slide outwardly at the rear of the hay bale carrier. After the hay bales have been released, the tailgate will drop back towards its closed position and due to its natural swinging movement, the momentum of the tailgate normally will be adequate to cause the rod 96 to engage the inclined surface 118 thus camming the latch 108 upwardly until the member 96 is moved to its position against the side angle member 82 or adjacent thereto so that the notch 120 can engage the rod or tube 96 thus retaining it in closed position. In some instances, the tailgate may have to be manually closed or provided with a pull rope at the bottom edge thereof for pulling it forwardly to bring it into engagement with the latching structure. The flexible rope or cable 100 may pass forwardly over an upwardly extending guide member 122 and then extend forwardly through suitable guide means to the operator of the tractor if the hay baler is a tractor towed device or the operator of the hay baler if the hay baler is self-propelled. In either event, the point of discharge of the hay bales from the carrier may be controlled so that the hay bales may be grouped and orientated in a desired position.

The hay bale carrier of the present invention does not employ any power insofar as conveyors or the like are concerned inasmuch as the chute which receives the hay bales merely provides a guide for the hay bales so that the hay baler itself will cause the hay bales to be forced up the chute inasmuch as a hay bale will be forced up the chute by engagement of a subsequent hay bale with the end of the previously discharged bale. After a desired number of hay bales have been deposited in the hay bale carrier, the pull rope or trip rope may be pulled thus releasing the tailgate for discharge of the hay bales. Since these hay bales will be more or less piled in the carrier, they will lift the tailgate, or at least the bottom end thereof, to a relatively high position so that as the tailgate drops off of the hay bales which have been discharged, the tailgate will swing back towards the rear edge of the side walls 48 for re-latching the tailgate automatically in position.

When the hay bale carrier is used for grouping the hay bales, it is desired that the hay bale carrier be disposed directly behind the discharge chute. However, when the hay bale carrier is to be conveyed over the road behind the hay baler, it is desired that it be located behind the baler so that the assembly may easily traverse through narrow openings such as gate openings or the like which are encountered on many farms. Thus, in one position, the hay bale carrier will track behind the discharge chute or compression chamber of the hay baler while in the other position, it will track directly behind the hay baler so that the baler and carrier may pass through narrow openings.

It will be understood that various types of structural elements may be employed in making the device of the present invention including angle iron members, tubular members, solid rods and the like. The device is supported on a mobile frame including supporting wheels at the ends of the axle and the frame may be supported by any suitable type of pneumatic tires, spring assemblies and the like. Also, the specific configuration of the drawbar 16 may vary and may be attached to various types of hay balers in different manners. Also, the structure of the actuating arm 98 to which the pull cord 100 is attached is weighted at the outer end thereof for retaining the plate 106 in a generally horizontal position thus assuring that when the tailgate swings back towards its normal position from an upwardly pivoted position, it will swing sufficiently past a vertical position to have the transverse rod 96 engaged by the latch 108 thus retaining the tailgate in closed position. Also, the transverse rod or tube 96 may be retained in place insofar as the vertical straps 88 are concerned by suitable setscrews or the like extending downwardly alongside of the plate 102 at each side of the tailgate assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A carrier for hay bales comprising a mobile frame, a bale carrying compartment having side walls and a downwardly and rearwardly inclined bottom, a tailgate assembly suspended from the upper rear corner of the compartment, means detachably connecting the lower end of the tailgate to the bottom edge of the bottom of the compartment for enabling hay bales disposed on the inclined bottom to be discharged from the compartment, means projecting forwardly from the mobile frame for connection with a hay baler, and means engaged with the front upper end of the inclined bottom for conveying hay bales from a hay baler to the upper forward end of the bottom of the compartment, said means for connection with a hay baler including a tongue, said tongue being pivotally attached to said mobile frame, and means interconnecting the frame and tongue for orientating the tongue in angularly adjusted positions whereby the mobile frame may be orientated directly behind the discharge chamber of the hay baler and directly behind the hay baler for tracking therebehind when passing through narrow openings, said means retaining the lower end of the tailgate assembly in closed position including a latch member pivotally mounted on the side wall of the compartment, said tailgate assembly including a laterally extending rod engageable with the latch member, a release arm attached to said rod for pivoting the rod, a plate on said rod for engaging the latch member when the rod is pivoted for releasing the latch member when the rod is pivoted, and a flexible member attached to said arm for pivoting the same and causing the latch member to be released.

2. The structure as defined in claim 1 wherein said tailgate assembly includes a plurality of parallel vertically orientated slats, each slat including a loop on the upper end thereof, and a transversely extending rod pivotally supporting said loops for pivotally supporting said tailgate assembly.

3. The structure as defined in claim 2 wherein said bottom is constructed of a plurality of spaced boards, said side walls forming the compartment extending perpendicularly therefrom and having outwardly flared upper end portions for guiding hay bales therebetween.

4. The structure as defined in claim 3 wherein said means for conveying the bales of hay from the hay baler to the chamber including an upwardly inclined chute, depending lug means on the upper end of said chute hanging over the edge of the forward end of the bottom for retaining the chute in place.

5. The structure as defined in claim 3 wherein said means for conveying hay bales from the baler to the upper edge of the bottom of the compartment including an elongated narrow chute having a curved lower portion merging with the discharge chamber of the hay baler, guide means on each side of the chute for guiding hay bales thereon whereby hay bales discharged from the hay baler will push preceding hay bales up the chute and into the compartment.

6. A hay bale carrier for use with a hay baler of the type discharging completed hay bales therefrom comprising a mobile frame, means laterally adjustably connecting the frame to the hay baler for receiving hay bales therefrom, said frame including a bale carrying compartment having side walls and a downwardly and rearwardly inclined bottom, a tailgate assembly connected to the compartment and selectively discharging hay bales therefrom, means retaining the tailgate in closed position and means engaged with the front upper end of the inclined bottom for conveying hay bales from the hay baler to the upper forward end of the bottom of the compartment, said last-named means including an inclined chute alignable with the hay baler whereby hay bales discharged from the baler will force preceding bales upwardly along the chute with the carrier relying solely upon the hay bales discharged from the hay baler for conveying the hay bales into the carrier, said means retaining the tailgate in closed position including a latch member pivotally mounted on the side wall of the compartment, a laterally extending rod mounted on the compartment, an arm attached to said rod for pivoting the same, a projection on said rod for engaging the latch member when the rod is pivoted for releasing the latch member, and means attched to said arm on the rod pivoting the same and causing the rod to pivot and release the latch member.

References Cited by the Examiner

UNITED STATES PATENTS

| | | | |
|---|---|---|---|
| 886,430 | 5/1908 | Smith | 214—42 X |
| 2,316,435 | 4/1943 | James | 56—474 |
| 2,390,306 | 12/1945 | Hunziker | 214—41 |
| 2,600,028 | 6/1952 | Steffen | 198—7 |
| 2,767,866 | 10/1956 | Heinje | 214—42 |
| 2,845,770 | 8/1958 | Fessler | 56—473.5 |

GERALD M. FORLENZA, *Primary Examiner.*

A. J. MAKAY, *Assistant Examiner.*